(No Model.)
C. F. RUTTERFORD.
ARTIFICIAL TOOTH.
No. 516,120. Patented Mar. 6, 1894.
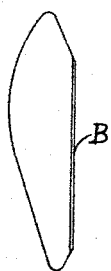
Witnesses.
Edward E. Lyons
Frederick G. Paternoster
Inventor
Chas. F. Rutterford
Per William H. Le Fevre
Attorney

UNITED STATES PATENT OFFICE.

CHARLES FREDERICK RUTTERFORD, OF LONDON, ENGLAND.

ARTIFICIAL TOOTH.

SPECIFICATION forming part of Letters Patent No. 516,120, dated March 6, 1894.

Application filed March 2, 1893. Serial No. 464,459. (No model.)

*To all whom it may concern:*

Be it known that I, CHARLES FREDERICK RUTTERFORD, dentist and dental manufacturer, a subject of the Queen of Great Britain and Ireland, and a resident of 11 Poland Street, London, in the county of Middlesex, England, have invented certain new and useful Improvements in the Manufacture of Artificial Teeth; and I do hereby declare that the following is a full, clear, and exact description of the invention, which will enable others skilled in the art to which it appertains to use the same.

My invention relates to improvements in the manufacture of artificial teeth, whereby they are not affected injuriously by any backing of metal, rubber or other material used to attach them to the plate. I accomplish this by painting with a brush or otherwise covering the back or part of the back of the tooth with an opaque mineral substance composed of the same or similar material as the tooth, and clay, or other similar substance, to render it opaque. In those cases when this white opaque substance might be conspicuous, I may after applying the beforementioned mineral substance cover it with a thin coat of a material of the same or similar composition as the tooth itself, thereby practically inclosing the opaque mineral substance in with the tooth.

The backing is preferably effected by any of the following means: I may paint or otherwise cover the back of the tooth with the opaque mineral when it is taken from the mold; or I may paint or otherwise cover the mold or portion of the mold before the tooth is molded, in such a manner that when the tooth is taken out from the mold the opaque mineral substance adheres to it and is afterward baked in; or I may bake the tooth first and then paint or otherwise cover the back with the opaque mineral substance and bake it in by a second firing.

All bodies of artificial teeth at present made are more or less translucent, permitting the backing of metal, rubber or whatever material is used in attaching the tooth to the plate, casting its shadow and more or less injuriously affecting the appearance of the tooth, this being more noticeable in the lighter shades and in the thinner teeth; this is effectually prevented by the presence of the opaque mineral substance which also adds a lifelike character to the tooth that is not obtained under the conditions at present employed.

In the accompanying drawing the figure is a side view of a tooth, in which B is the backing. This view is of course exaggerated.

Having fully described my invention, what I claim, and desire to secure by Letters Patent, is—

In an artificial tooth a backing of a composition of the same, or similar material as the tooth, and clay or other similar substance to render it opaque, for the purposes described and set forth.

CHARLES FREDERICK RUTTERFORD.

Witnesses:
 FREDERICK N. CARRINGTON,
 EDWARD E. LYONS.